United States Patent [19]

Brown

[11] 3,882,037

[45] May 6, 1975

[54] STABILIZED BORANE-TETRAHYDROFURAN SOLUTIONS

[75] Inventor: Herbert C. Brown, West Lafayette, Ind.

[73] Assignee: Aldrich-Boranes, Inc., Milwaukee, Wis.

[22] Filed: Feb. 22, 1973

[21] Appl. No.: 334,642

[52] U.S. Cl. .................. 252/188; 149/22; 252/105; 260/606.5 B; 423/294; 423/295
[51] Int. Cl............................................. C01b 35/00
[58] Field of Search ............. 252/188, 105; 149/22; 260/462 R, 606.5 B; 423/294, 295

[56] References Cited
UNITED STATES PATENTS

| | | | |
|---|---|---|---|
| 3,078,309 | 2/1963 | Brown | 260/606.5 B |
| 3,078,311 | 2/1963 | Brown | 260/606.5 B |
| 3,634,277 | 1/1972 | Brown | 252/188 |

*Primary Examiner*—Benjamin R. Padgett
*Assistant Examiner*—Irwin Gluck
*Attorney, Agent, or Firm*—Merriam, Marshall, Shapiro & Klose

[57] ABSTRACT

The presence of an aliphatic, alicyclic, or cyclic sulfide stabilizes solutions of diborane in tetrahydrofuran, permitting the storage of such solutions for long periods of time at ambient temperatures. Such stabilized solutions can be prepared without handling diborane gas by treating a suspension of an ionic borohydride in tetrahydrofuran, containing an aliphatic, alicyclic, or cyclic sulfide, with boron trifluoride, followed by removal of the precipitated fluoroborate. Such solutions are excellent for hydroboration, and possess major advantages over borane-tetrahydrofuran solutions available previously in being highly stable.

15 Claims, No Drawings

STABILIZED BORANE-TETRAHYDROFURAN SOLUTIONS

BACKGROUND OF THE INVENTION

This invention relates to novel stabilized solutions of diborane in tetrahydrofuran containing as the stabilizing agent an aliphatic, alicyclic, or cyclic sulfide, and to the process of preparing the same. It also relates to a process for preparing such stabilized solutions without handling gaseous diborane, by evolving diborane in situ in the presence of tetrahydrofuran containing an aliphatic, alicyclic, or cyclic sulfide.

DESCRIPTION OF THE PRIOR ART

Diborane, $B_2H_6$, is a chemical with remarkable properties. It reacts instantly with olefins in the presence of ethers, such as tetrahydrofuran, to form organoboranes.

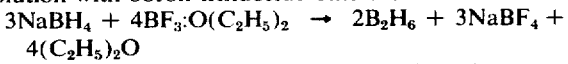

This process is known as "hydroboration," and is fully described in my patent (H. C. Brown, U.S. Pat. No. 3,078,311, Feb. 19, 1963) and in my book (H. C. Brown, *Hydroboration*, W. A. Benjamin Co., New York, 1962).

Diborane is also an exceedingly powerful, but selective hydrogenating agent for functional groups. Whereas sodium borohydride is a basic-type reducing agent, diborane is an acidic-type reducing agent. The availability of both an acidic and a basic-type reducing agent makes possible numerous selective reductions or hydrogenations of functional groups.

Sodium borohydride, a crystalline solid, is a stable reagent which is easily manufactured, stored, shipped, and used. Diborane, however, is a gas, boiling at $-92.5°C$, which is highly reactive towards air and moisture and consequently difficult to handle. Although attempts have been made to compress diborane in tanks for shipment, this practice involves major difficulty. Diborane in contact with the metal of the cylinders or tanks decomposes spontaneously into hydrogen and higher hydrides of diborane. For this reason, it is recommended that such cylinders be refrigerated and shipped or stored at low temperatures.

A possible solution to these difficulties would be to dissolve diborane in a suitable solvent and to ship the material in that form. Unfortunately, diborane does not possess adequate solubility in hydrocarbon solvents. It cannot be stored in such solvents as esters, dimethyl sulfoxide, or dimethylformamide, since these undergo relatively rapid reduction. With amines, diborane reacts to form relatively stable amine-boranes, which fail to exhibit the desirable properties of diborane itself.

In ethers, such as diethyl ether, di-n-butyl ether, monoglyme (dimethyl ether of ethylene glycol), and diglyme (dimethyl ether of diethylene glycol), the solubility of diborane is far too low to permit preparation of solutions containing enough diborane to be useful.

One suitable solvent for diborane is known. Diborane is highly soluble in tetrahydrofuran, a cyclic ether. (J. R. Elliott, W. L. Roth, G. F. Roedel and E. M. Boldebuck, *J. Am. Chem. Soc.*, 74, 5211 (1952)). In this solvent it is possible to prepare solutions which are as concentrated as 4 molar in borane ($BH_3$), without exceeding one atmosphere of pressure. Moreover, such solutions are relatively safe to use. They can be exposed to the atmosphere without observable change, and can be poured through the air or into evaporating dishes and allowed to evaporate, without catching fire.

Solutions of diborane in tetrahydrofuran are ideal for hydroborations and selective hydrogenations. Unfortunately, two major problems arise in the manufacture and shipment of such solutions.

The first problem stems from the dangerous nature of diborane. In the past it has been customary to generate diborane by treating sodium borohydride in diglyme solution with boron trifluoride-etherate.

$$3NaBH_4 + 4BF_3{:}O(C_2H_5)_2 \rightarrow 2B_2H_6 + 3NaBF_4 + 4(C_2H_5)_2O$$

The evolved diborane gas is then passed into the tetrahydrofuran solvent to make the solution. This process is undesirable in that it requires the preparation and handling of large amounts of gaseous diborane, an exceedingly reactive and hazardous material.

The second difficulty arises from the fact that solutions of diborane in tetrahydrofuran have highly limited shelf-lives at ordinary temperatures. Such solutions undergo reductive cleavage of the tetrahydrofuran by the diborane (J. Kollonitsch, *J. Am. Chem. Soc.*, 83, 1515 (1961)).

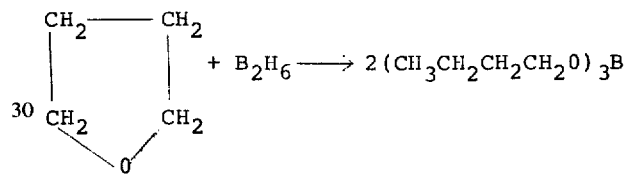

As a result, the solutions lose 1 to 3 percent of the available diborane per day at ordinary temperatures (25° to 30°C.), making their manufacture, storage, and shipment impractical.

In my U.S. Pat. No. 3,634,277 I described a means of stabilizing such solutions by adding thereto small amounts of sodium borohydride or other ionic borohydride in quantities not exceeding the solubility of the borohydride in the borane-tetrahydrofuran solution. Such solutions are thereby stabilized for periods of 4 to 8 weeks. Over longer periods, however, the solutions deteriorate. Another disadvantage is that the vapor pressure of diborane above such solutions is relatively high, so that the solutions are usually manufactured in relatively low concentrations not exceeding 1 molar in $BH_3$. This means that large amounts of solvent must be handled and shipped for a relatively small quantity of diborane. In addition, in some reactions the included sodium borohydride is active and interferes with the desired reaction of the diborane component. The present invention overcomes these disadvantages.

SUMMARY OF THE INVENTION

I have discovered that the addition of a sulfide to a solution of diborane in tetrahydrofuran greatly stabilizes the solution, far more effectively and for longer periods of time than does sodium borohydride. Solutions stabilized in this manner are effective reagents for hydroborations. In a preferred embodiment of the invention the diborane is formed in situ in the presence of tetrahydrofuran containing a sulfide, by the reaction of $BF_3$ with a metal or other ionic borohydride. Stabilized borane-tetrahydrofuran solutions can be prepared in this manner without the necessity for handling hazardous gaseous diborane.

DESCRIPTION OF THE PREFERRED EMBODIMENTS

The sulfides which can be used in the invention include aliphatic sulfides, such as dimethyl sulfide, methylethyl sulfide, diethyl sulfide, methylpropyl sulfide, methylbutyl sulfide, and other lower alkyl sulfides; alicyclic sulfides, such as methylcyclopentyl sulfide and methylcyclohexyl sulfide; cyclic sulfides, such as tetramethylene sulfide, pentamethylene sulfide and heptamethylene sulfide; and disulfides, such as 1,3-dithiomethylpropane, $CH_3SCH_2CH_2CH_2SCH_3$. The sulfides can contain inert substituents, such as methoxy and methyl groups, as in $CH_3OCH_2CH_2SCH_3$ and 2-methyltetramethylene sulfide. For greatest effectiveness, it is desirable that the molecular weight of the sulfide be low, preferably below 200, so that relatively high molar concentrations can be achieved in the tetrahydrofuran solutions without markedly decreasing the tetrahydrofuran content of these solutions. Dimethyl sulfide is preferred because of its low molecular weight and its low cost.

It is preferred that the concentration of the sulfide used in accordance with the invention to stabilize diborane-tetrahydrofuran solutions be equal, on a molar basis, to the concentration of borane ($BH_3$ in the solution). Thus, for example, a solution that is 2 molar in borane is advisedly also 2 molar in the sulfide. As the concentration of sulfide added to the solution drops below that of the borane, the solution becomes increasingly less inhibited against borane loss. For purposes of the invention, any concentration of sulfide above about 50 percent of the molar concentration of borane will yield a practical benefit in stability, with the maximum effect being achieved at an equimolar concentration. Solutions more concentrated in sulfide than equimolar with borane can also be used, but are less desirable, since no significant increase in stability is achieved, while the tetrahydrofuran concentration of the solution may be undesirably reduced.

The vapor pressure of diborane above such solutions is greatly reduced and tetrahydrofuran solutions that are as concentrated as 5 molar or more in borane and sulfide are quite stable, easily handled, and readily utilized for hydroboration.

The effectiveness of the sulfides of the invention in stabilizing diborane-tetrahydrofuran solutions is exemplified by the data of Table I, showing the use of dimethyl sulfide for this purpose. Similar results can be achieved with the other sulfides contemplated for use in the invention.

TABLE I

STABILITY OF SOLUTIONS OF BORANE IN TETRAHYDROFURAN
IN PRESENCE AND ABSENCE OF DIMETHYL SULFIDE AT 25°C.

| Time, weeks | Concentration of $BH_3$ (no additive) | | Concentration of $BH_3$ (in presence of equimolar concentration of dimethyl sulfide) | |
|---|---|---|---|---|
| | M | Percent | M | Percent |
| 0 | 1.61 | 100 | 2.02 | 100 |
| 2 | 1.41 | 90 | 2.02 | 100 |
| 4 | 1.29 | 80 | 2.02 | 100 |
| 6 | 1.13 | 70 | 2.02 | 100 |
| 8 | 0.97 | 60 | 2.02 | 100 |

The stabilized sulfide-containing solutions of the invention can be prepared by dissolving gaseous diborane in a solution of the sulfide in tetrahydrofuran, or by adding the sulfide to a solution of diborane in tetrahydrofuran. However, these procedures require the handling of diborane gas, a highly reactive hazardous material. I have discovered that highly stabilized diborane solutions can be prepared by adding boron trifluoride as a gas or a complex with an organic base to a suspension of an ionic borohydride in tetrahydrofuran containing the desired sulfide for stabilization, liberating diborane which passes into solution. Although a wide variety of ionic borohydrides, such as lithium borohydride and tetramethylammonium borohydride, can be used, I prefer sodium borohydride because of its economy. In this way the stabilized solutions of the invention can be prepared without the necessity of handling gaseous diborane.

Preparation of the stabilized diborane solutions of the invention is illustrated by the following examples.

EXAMPLE 1

In a 2-liter flask flushed with nitrogen was placed 0.80 liter of dry tetrahydrofuran. Sodium borohydride, 57 g. (1.5 moles), was added and the mixture was vigorously stirred to keep the salt in solution. 2 moles of ethyl ether-boron trifluoride was added slowly to the well-stirred solution cooled in an ice salt bath to maintain the temperature at 0°. After all of the etherate have been added, the solution was stirred for an additional hour, a filter stick was then introduced and the solution pushed through the filter stick by nitrogen pressure into the storage bottle. To the cold filtered solution was added 124 g. (2.0 moles) of dimethyl sulfide and a small amount of tetrahydrofuran to make the total volume 1.0 liter. The yield was almost quantitative, the solution (1.0 liter) analyzing about 1.96 molar in borane. No change in the borane content of the solution, maintained at 25°C. under nitrogen, occurred over a storage period of eight weeks.

As a control, a solution of diborane was prepared following the above procedure, except that no dimethyl sulfide was added. The control solution was not stable in storage, but rather underwent a loss of approximately 2 percent of active hydrogen per day.

EXAMPLE 2

Dimethyl sulfide, 124 g. (2.0 moles), was dissolved in 700 ml of tetrahydrofuran. One mole of diborane was generated from boron trifluoride etherate and sodium borohydride in diglyme and the gas was passed into the tetrahydrofuran solution. Sufficient tetrahydrofuran was added to make the volume 1 liter. Analysis revealed the borane concentration to be 2.0 molar. No change in borane content was observed over 8 weeks.

EXAMPLE 3

Tetramethylene sulfide (tetrahydrothiophene), 176 g. (2.0 moles), was dissolved in 500 ml of tetrahydrofuran. One mole of diborane was generated from boron trifluoride etherate and sodium borohydride in diglyme and the gas was passed into the tetrahydrofuran solution. Sufficient tetrahydrofuran was added to make the volume one liter. Analysis revealed the borane concentration to be 2.0 molar. No change in borane content was observed over two weeks.

EXAMPLE 4

A 2-liter flask was immersed in an ice bath. In the flask was placed 58 g. (1.5 moles) of sodium borohydride (98 percent), 625 cc of tetrahydrofuran, and 124 g. of dimethyl sulfide. The flask was flushed with nitrogen and a static nitrogen pressure maintained. Through a dropping funnel was added to the stirred mixture 225 ml (2.0 moles) of tetrahydrofuran-boron trifluoride over one hour. The mixture was brought to room temperature and allowed to stand overnight. The sodium fluoroborate settled, yielding a clear solution. The clear solution was pushed with nitrogen through a hypodermic needle into storage flasks. Analysis revealed the borane concentration to be 1.99 molar (theoretical 2.00), indicating a yield of 99.5 percent of the available hydride.

EXAMPLE 5

The preparation can also be carried out with the reactants at 25°. The reaction is slightly exothermic, so water cooling should be used.

A 2-liter flask was connected to a dropping funnel, a stirrer, and a nitrogen source. In the flask was placed 625 cc of tetrahydrofuran and 58 g. (1.5 moles) of sodium borohydride (98 percent). The flask and contents were flushed with nitrogen and a static nitrogen atmosphere maintained. Then 125 g. of dimethyl sulfide was added. A water bath was placed about the flask. To the stirred reaction mixture was added 225 ml (2.0 moles) of tetrahydrofuranboron trifluoride over a period of 1 hour, maintaining the temperature at approximately 25°. The reaction was allowed to settle overnight. The clear solution was transferred by means of a hypodermic needle into a storage flask. Analysis revealed the borane concentration to be 1.99 molar (theoretical 2.00), indicating a yield of 99.5 percent of the available hydride.

In addition to the specific sulfides used in the above examples, other previously described sulfides can be used with similar results.

The stabilized diborane solutions of the invention are highly effective for hydroborations and other reactions. For example, a solution of borane in tetrahydrofruan was used to hydroborate a number of olefins at 25°. The reaction mixtures were allowed to stand for 1 hour, and then oxidized with alkaline hydrogen peroxide. 1-Hexene gave a 99.5 percent yield of alcohols, 94.6 percent of 1-hexanol, 5.4 percent of 2-hexanol. cis-3-Hexene gave an 88 percent yield of pure 3-hexanol. Norbornene was converted into the 2-norbornanol in 98% yield, 99 percent exo and 1 percent endo. Finally, 1-methylcyclopentene gave a 95 percent yield of its alcohol, 98.9 percent trans-2-methylcyclopentanol and 1.1 percent of 1-methyl-1-cyclopentanol.

The foregoing detailed description has been given for clearness of understanding only, and no unnecessary limitations should be understood therefrom, as modifications will be obvious to those skilled in the art.

What is claimed is:

1. A method for stabilizing a solution of diborane in tetrahydrofuran which comprises incorporating in said solution an effective concentration of an alkyl, alicyclic, or cyclic sulfide.

2. The method of claim 1 in which said sulfide has a molecular weight less than about 200, and is present in said solution in an amount of at least about one mole per mole of borane.

3. The method of claim 2 in which said sulfide is dimethyl sulfide.

4. The method of claim 2 in which said sulfide is diethyl sulfide.

5. The method of claim 2 in which said sulfide is tetramethylene sulfide.

6. A solution of diborane is tetrahydrofuran which contains as a stabilizing agent an effective concentration of an alkyl, alicyclic or cyclic sulfide.

7. The solution of claim 6 wherein said sulfide has a molecular weight less than about 200 and is present in said solution in an amount of at least 1 mole per mole of borane.

8. The solution of claim 7 wherein said sulfide is dimethyl sulfide.

9. The solution of claim 7 wherein said sulfide is diethyl sulfide.

10. The solution of claim 7 wherein said sulfide is tetramethylene sulfide.

11. A process for preparing a stabilized solution of diborane in tetrahydrofuran which comprises reacting an ionic borohydride with $BF_3$ in the presence of tetrahydrofuran containing an alkyl, alicyclic or cyclic sulfide in an amount effective to stabilize the resulting solution, and separating the stabilized solution from the reaction mixture.

12. The method of claim 10 wherein said ionic borohydride is sodium borohydride.

13. The method of claim 12 in which said sulfide is dimethyl sulfide and is present in said stabilized solution in an amount of at least one mole per mole of borane.

14. The method of claim 12 in which said sulfide is diethyl sulfide and is present in said stabilized solution in an amount of at least 1 mole per mole of borane.

15. The method of claim 12 in which said sulfide is tetramethylene sulfide and is present in said stabilized solution in an amount of at least 1 mole per mole of borane.

* * * * *